US 6,658,256 B2

(12) United States Patent
Wille

(10) Patent No.: US 6,658,256 B2
(45) Date of Patent: Dec. 2, 2003

(54) METHOD FOR ALLOCATING A CHANNEL IN A CELL OF CELLULAR NETWORK

(75) Inventor: Volker Wille, Hemingford Grey (GB)

(73) Assignee: Nokia Corporation, Espoo (FI)

( * ) Notice: Subject to any disclaimer, the term of this patent is extended or adjusted under 35 U.S.C. 154(b) by 44 days.

(21) Appl. No.: 09/871,456

(22) Filed: May 31, 2001

(65) Prior Publication Data

US 2002/0107037 A1 Aug. 8, 2002

Related U.S. Application Data

(63) Continuation of application No. PCT/GB00/03762, filed on Sep. 29, 2000.

(30) Foreign Application Priority Data

Oct. 1, 1999 (GB) ................................................ 9923271

(51) Int. Cl.[7] ................................................. H04Q 7/20
(52) U.S. Cl. ........................ 455/450; 455/62; 455/67.1; 455/449
(58) Field of Search ................................. 455/447, 448, 455/449, 450, 451, 452, 62, 63, 67.1; 370/329, 332

(56) References Cited

U.S. PATENT DOCUMENTS 5,828,963 A  10/1998  Grandhi et al.
6,005,853 A  * 12/1999  Wang et al. ................. 370/332

FOREIGN PATENT DOCUMENTS

WO    WO 98/08348    2/1998

OTHER PUBLICATIONS

Volker Wille, Hannu Multimaki and Sean Irons; "A Practical Approach to 'Channel Borrowing' For Microcells In GSM Systems", VTC 1998, 48th IEEE Vehicular Technology Conference, Pathway To Global Wireless Revolution, Ottawa, Canada, May 18–21, 1998, vol. 1, pp. 144–148.

International Search Report for PCT/GB00/03762.

* cited by examiner

*Primary Examiner*—Lee Nguyen
(74) *Attorney, Agent, or Firm*—Squire, Sanders & Dempsey LLP

(57) ABSTRACT

Disclosed herein is a method of allocating a channel in a cell of a cellular network. The network includes a cell and a plurality of other cells. The method includes receiving in the cell, a plurality of signals from at least one other cell and determining the average signal strength and the standard deviation for the signals. The method also includes adding the average signal strength to the standard deviation to obtain information and using the information to determine one or more channels to be used in the cell.

16 Claims, 5 Drawing Sheets

METHOD FOR ALLOCATING A CHANNEL IN A CELL OF CELLULAR NETWORK

This application is a continuation of international application Ser. No. PCT/GB00/03762, filed Sep. 29, 2000.

FIELD OF THE INVENTION

The present invention relates to a method of channel allocation.

BACKGROUND OF THE INVENTION

With wireless cellular telecommunications networks, the area covered by the network is divided into a plurality of cells. Each cell has a base station which communicates with mobile stations in the cell associated with the base station.

However, in order to increase the available capacity in wireless telecommunications networks, microcells have been proposed. A microcell is typically used in urban environments and overlies larger cells which are referred to as macrocells. A microcell may typically cover a radius of 200 m. A microcell will have a base station with a transmitting and receiving antenna mounted below the height of the surrounding rooftops and the transmit power will be lower than that for macrocells. These microcells can be provided at traffic hot spots (an area with a high traffic density). Thus micro cells allow areas with high capacity requirements to be targeted.

It has been proposed that microcells share channels with the macrocells. Accordingly, various method have been proposed to determine which channels are available to the microcells. These methods typically involve the use of network planning tools which are cumbersome and time consuming.

Reference is made to WO98/26623 which describes a method of allocating a frequency to a cell in a cellular system. A cell is surrounded by a plurality of neighbouring cells. A measuring signal is transmitted from the cell to the neighbouring cells. The cells have a plurality of mobile stations which are served by a base station. The cellular radio system has first field strength measuring means for measuring the disturbance field strength, that is the magnitude of the disturbance caused by neighbouring cells in the new cell. Second field strength measuring means measure the field strength of the channel serving the mobile station. Ratios of field strength to disturbance field strength are determined, the ratio being utilised for forming a disturbance probability distribution which is used to allocate a suitable frequency to the cell. No reference to microcells and the associated problems are included in this reference.

"A practical approach to channel borrowing for microcells in GSM systems", V Wille, H Multimaki and S Irons was presented at the 48th Annual International Vehicular Conference (VTC'98) on behalf of the present applicant. This document proposed a method for identifying the least interfered channel for microcells so that channels for the microcell can be shared with the macrocells.

SUMMARY OF THE INVENTION

It is an aim of embodiments of the present invention to provide a method and apparatus for channel allocation which improves on the methods of the prior art. Embodiments of the present invention may improve on the method described in the paper mentioned hereinbefore.

According to one aspect of the present invention, there is provided a method of allocating a channel in a cell of a cellular network comprising said cell and a plurality of other cells, said method comprising the steps of:

receiving in said cell, a plurality of signals from at least one other cell;

determining the average signal strength of said plurality of signals and the standard deviation for said signals;

adding the average signal strength to the standard deviation to provide information; and using said information to determine one or more channels to be used in said cell.

According to a second aspect of the present invention, there is provided a network element for providing information for use in allocating a channel in a cell of a cellular network comprising said cell and a plurality of other cells, said network element comprising:

means for receiving information on the strength of a plurality of signals from at least one other cell;

means for determining the average signal strength of said plurality of signals and the standard deviation for said signals;

means for adding the average signal strength to the standard deviation to provide said information.

By using the standard deviation information, it is possible to improve the determination of which channel is to be used in a cell.

Preferably, the method includes the step of multiplying the sum of the standard deviation and the average signal strength by the number of the plurality of signals, the resulting information being used in the using step. Preferably, the information is determined for each of a plurality of other cells. The information determined for each other cell may be normalised with respect to the information for that cell and the other cell(s) for which information has been determined.

Preferably said cell has at least one station associated therewith, said at least one station being arranged to measure the strength of the signals received from the at least one other cell, the measurements being used to determine the average signal strength. The at least one station may be a mobile station.

A plurality of stations may be provided in the cell, each of said plurality of stations being arranged to measure the strength of signals received from said at least one other cell, the measurements being used in determining the average signal strength. The reference signals from at least one other cell may be received and the average strength of the reference signals may be determined.

A plurality of channels may be used in one of said other cells and the strength with which the channels would be received in said cell is determined from the information based on said reference signals. Preferably, at least one channel is used in more than one of said other cells and the strength which said at least one channel would be received in said cell is determined by adding the contribution for the at least one channel from the said more than one of said other cells together.

Preferably, in said using said information step, one or more of the channels used by at least one or more of the plurality of other cells and which are not received in said cell or received with a lower strength are allocated to said cell. Preferably, the received signals are from a base station in the respective at least one other cell. The cellular network may be a GSM network. The received signals may be from a base station in the respective at least one other cell and the signals may be the BCCH channel of the respective base station.

The cell may be a microcell. The cell may alternatively or additionally be an inbuilding cell.

BRIEF DESCRIPTION OF DRAWINGS

For a better understanding of the present invention and as to how the same may be carried into effect, reference will now be made by way of example to the accompanying drawings in which.

DETAILED DESCRIPTION OF EMBODIMENTS OF THE PRESENT INVENTION

Figure 1:
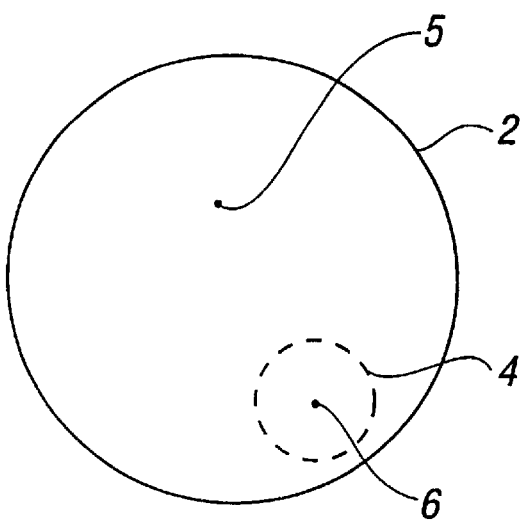
FIG. 1 shows a schematic illustration of a macrocell including a microcell.

To increase the capacity of a cellular network, microcells have been proposed. These microcells overlie the usual macrocells which make up the network. FIG. 1 illustrates a macrocell 2 which contains a microcell 4. Typically, the microcell will be located at a traffic hot spot in the macrocell, that is a location where there is a large amount of traffic. The macrocell may be 500 m or larger and the microcell is typically of the order of 200 m.

Both the macrocell and the microcell will have their own respective base transceiver station 5 and 6. Mobile stations in the macrocell will communicate with the macrocell base transceiver station 5 whilst mobile stations in the microcell will communicate with the microcell base transceiver station 6. It is of course possible for a mobile station in the microcell area to communicate with the underlying macrocell. The microcell may overlap one or more macrocells.

Figure 2:
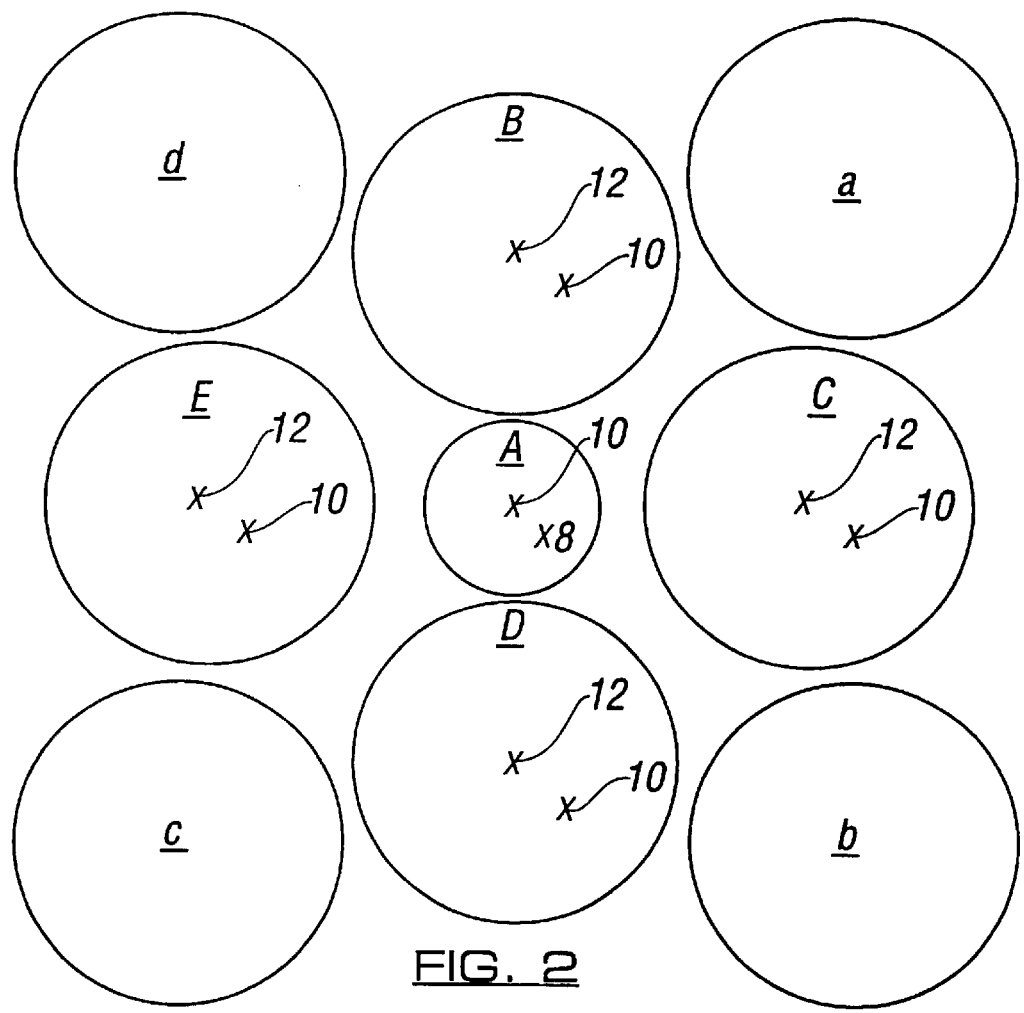
FIG. 2 shows a schematic view of a cellular network for the explanation of the present invention.

The embodiments of the present invention will be discussed in the context of a GSM system. In the GSM system a channel has to be assigned to each user in a cell. This will define a frequency for the user. The microcells are arranged to share channels with the underlying macrocells. Embodiments of the invention are concerned with the allocation of frequencies to the microcells where the microcells and the macrocells share channels. In embodiments of the present invention, the least interfered channel(s) in a microcell are identified and one or more of these channels can be used by the microcell. Reference will now be made to FIG. 2 which shows schematically a cell A in which a mobile station 8 is currently located. Cell A is a microcell. The method which is described hereinafter is concerned with allocating channels to this microcell. It should be appreciated that an actual implementation would be more complicated with cell A at least being partly in another cell. This cell A is the serving cell for the mobile station. The mobile station 8 will sent signals to and receive signals from the base station 10 associated with the serving cell A. The serving cell is surrounded by four immediately neighbouring cells B-E each of which is provided with a base station. These neighbouring cells are macrocells but in alternative embodiments of the present invention, one or more of the neighbouring cells are microcells. Mobile stations 10 located in the neighbouring cells will communicate with the respective base station 12 associated with the cell in which the mobile station is located.

In addition to the immediately adjacent cells, there are cells in the vicinity of the microcell which can also provide signals in the micocells. These cells are referenced a to d.

A mobile station in the GSM standard will measure the strength of a signal from the current cell and the six strongest signals from neighbouring cells. The signal which is measured by the mobile station is the broadcast control channel BCCH. Information on the measurements made by the mobile station is provided to the serving base station. The measurement information is provided to the serving base station every 480 ms. This information is, as discussed hereinafter used in embodiments of the present invention. This has the advantage that a dedicated radio survey of the coverage area of a microcell is not required. Instead readily available information can be used. As the mobile stations in the cells make the measurements discussed hereinbefore, a true picture of the signal levels within a cell can be obtained. Additionally, the use of cumbersome frequency planning tools can be avoided.

In preferred embodiments, the analysis embodying the present invention is performed for approximately an hour and generally during a busy traffic time.

In a typical GSM urban network, the distance between the centre of macrocells is about 1 km and within a radius of 2 km of a microcell, there will be several macrocells. Other configurations are of course possible and can occur.

The level of coverage provided from a neighbouring cell within the service area of the analysed microcell, that is cell A, is the cell coverage factor CCF. The cell coverage factor thus represents the signal level in the analysed cell which is from a given neighbouring cell. It should be appreciated that the term "neighbouring cells" generally refers to the immediately neighbouring cells B to E but can also include cells in the vicinity of the microcell such as cells a to d.

The cell coverage factor is the product of the number of times that the BCCH channel from a neighbouring cell was measured and the average signal level obtained on this channel. This can be expressed as follows:

$$CCF = avg.Sig.lev * Nr.Samples$$

where

CCF is the cell coverage factor caused by a given neighbouring cell to cell A avg.Sig.Lev is the average signal level from neighbouring cell Nr.samples is the number of samples obtained from the neighbouring cell As is apparent, the higher the value of the cell coverage factor, the higher the level of coverage provided by the neighbouring cell. A cell coverage factor value can be calculated for each cell neighbouring cell A as well as for cells which are in the vicinity of the microcell, cell A. In practice a cell coverage factor value can be calculated for each cell from which signals can be measured.

It has been found that the results obtained by the method described hereinbefore can be significantly improved if the standard deviation of the average signal level is added to the average signal level before multiplying it by the number of samples. The modified equation which is used is as follows:

$$CCF = (avg.Sig.Lev + std.dev) * Nr.samples$$

where

CCF is the cell coverage factor avg.Sig.Lev is the average signal level from neighbouring cell.

std.dev is the standard deviation of the signal level from the neighbouring cell Nr.samples is the number of cells obtained from the neighbouring cells The average signal level is the average of the measurements made by a number of mobile stations in the microcell of the BCCH channel of the neighbouring cell for which the cell coverage factor value is being determined. The signal levels measured by the mobile stations are in dBm. If the measurements made by the mobile station are in mW, the measurements are converted to dBm values. The standard deviation is determined in dBm. The average signal value is added to the standard deviation. Before the resulting sum is multiplied by the number of samples, the sum is converted to mW.

The improved method improves the accuracy of the measurements. The number of samples is thus the total number of samples provided by each mobile station in the microcell A. More than one mobile station may make measurements and each mobile station may make more than one measurement of a given base station.

A cell coverage factor is calculated for each neighbouring base station.

In order to compare the results from different cells more easily, a normalisation of the cell coverage factor may be provided. The cell coverage factor ratio is the ratio of the cell coverage factor obtained from one neighbouring cell to the cell coverage factor obtained from all the neighbouring cells. This relation is expressed by the following equation:

$$CCF\ Ratio_x = \frac{CCF_x}{\Sigma\ CCF_x} * 100$$

where x is the cell number $\Sigma\ CCF_x$ is the sum of all cell coverage factors for all n cells measured.

CCF is the cell coverage factor.

This equation thus permits the contribution made by each cell to the level of coverage in the microcell to be expressed as a percentage.

Figure 3:
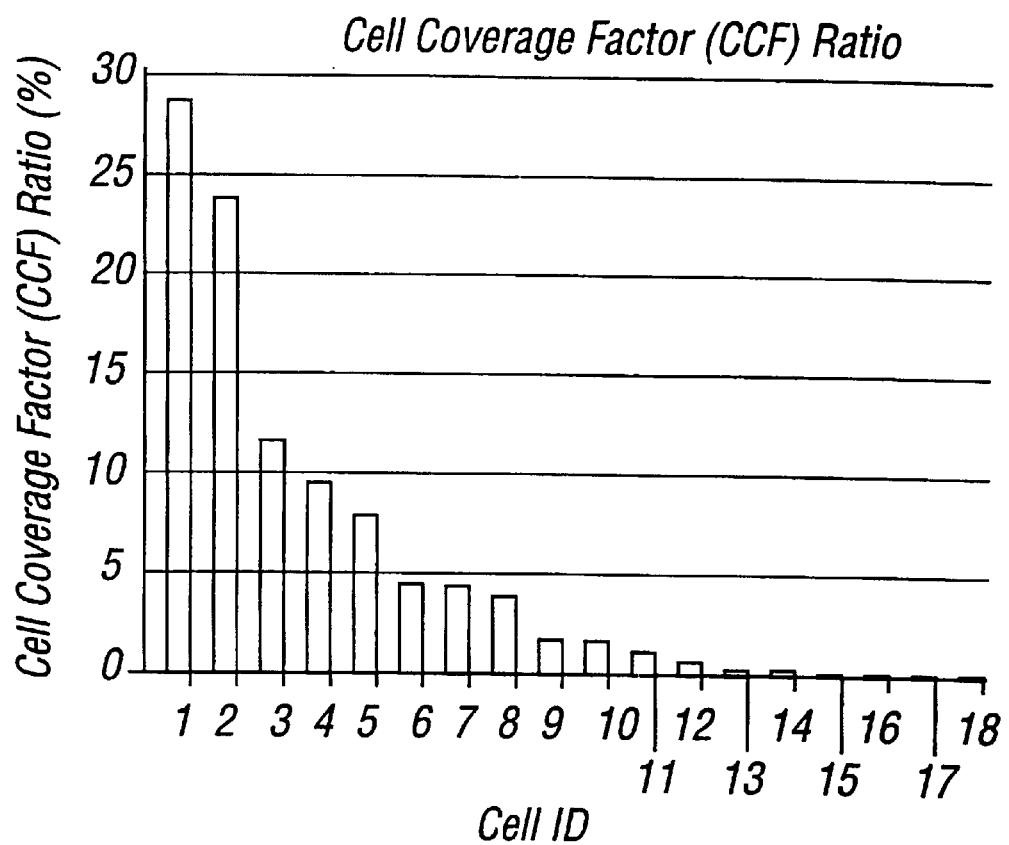
FIG. 3 shows a first graph of the cell coverage factor ratio for each cell.

Reference is made to FIG. 3 which shows the typical coverage levels from neighbouring cells within a microcell. In particular, FIG. 3 is a plot of the CCF ratio for each cell. As can be seen, the cell coverage factor ratio for cell B is 27% whereas the cell coverage factor ratio for cell C is about 23%. This means that about 50% of the cell coverage factor within the coverage area of the micro cell, cell A, originates from only two macrocells. This is typical and usually two or three macrocells will provide the main level of coverage within the service area of the microcell. Usually another 6 or 7 cells will provide relatively high levels of coverage, whilst the coverage from the remaining cells is relatively small.

Figure 4:
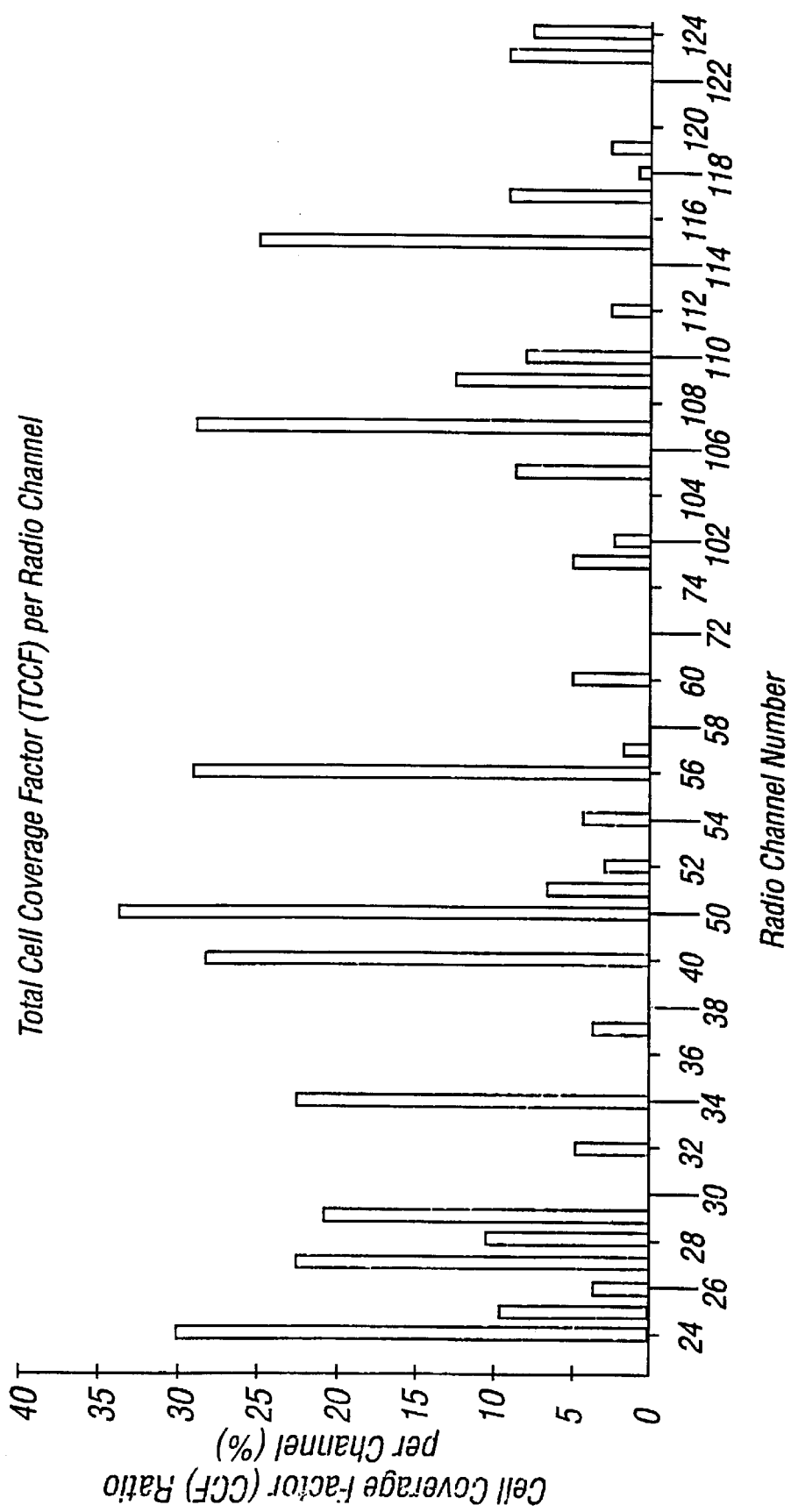
FIG. 4 shows a second graph of the cell coverage factor ratio for each channel.

In a GSM system, a number of different frequencies will be used by a base station. Using the measurements of the BCCH frequency provided in each cell in combination with information on the channel allocation, it is possible to determine the level of coverage of the microcell for each channel used by an operator. It is assumed that the cell coverage factor is not only applicable to the BCCH but also to each traffic channel of a cell. It is likely that a traffic channel is used on several neighbouring macrocells so the cell coverage factor from these macrocells are added together to provide a total cell coverage factor for each channel. Reference is made to FIG. 4 which shows a graph of the cell coverage factor ratio for each channel. The value for each channel is made up of the sum of the cell coverage factor ratio for each cell which uses a given channel. For example, the cell coverage factor ratio for channel 50 is equal to 35% which is obtained because this channel is used in cells C and D which have respective cell coverage area ratios of 23% and 12% respectively.

The purpose of this analysis is to determine a suitable channel for a microcell (cell A). Thus the existing coverage in the service area of the microcell is considered as interference. The level of interference for each of the channels within the coverage area of a microcell can be expressed by the following equation:

$$TCIR_y = \frac{\sum_{x=1}^{n} CCF_y}{\sum_{x=1}^{n} \sum_{y=1}^{m} CCF_{yx}} * 100$$

Where TCIR is the total channel interference ratio

CCF is the cell coverage factor

X is the cell number n is the maximum number of cells measured

Y is the channel number m are the channels used by the operator

Thus total channel interference ratio represents the normalisation of the interference experienced on each channel to the total level of interference experienced by all channels within the service area of the microcell. If the value of the total channel interference ratio TCIR is high, then it can be determined that there is a high level of interference for a given channel in the microcell and that the channel should not be used in the microcell.

Figure 5:
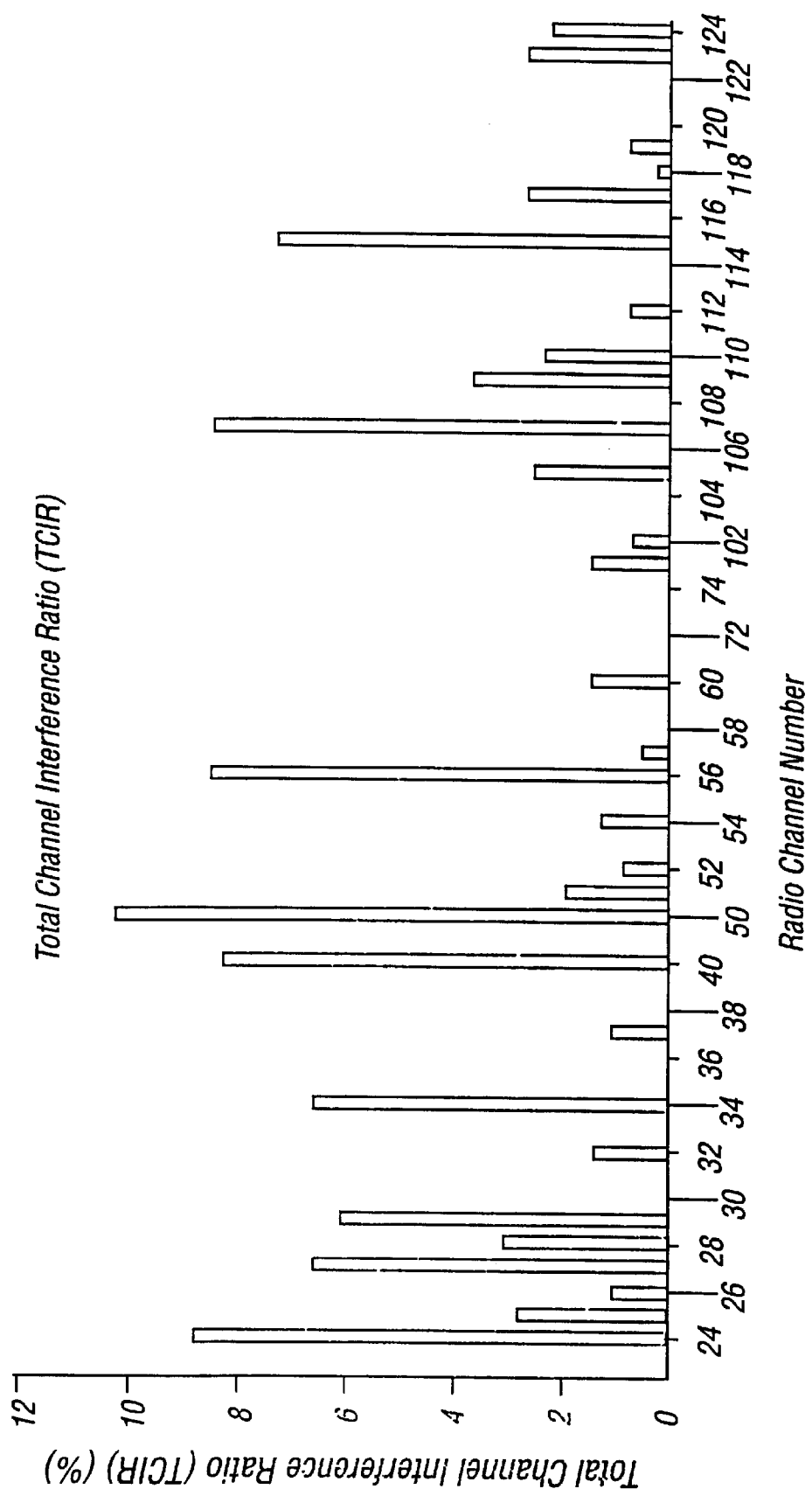
FIG. 5 shows the total channel interference ratio for a typical microcell.

Reference is made to FIG. 5 which shows the total channel interference ratio for each channel used by the operator in the microcell. As can be seen from FIG. 5, there are channels which have a relatively high levels of interference in the service area of the microcell such as channels 24, 48, 50, 56 and 107. Channels 71 to 74, for example do not display any interference.

The channels which have little or no interference can be selected for use in the microcells. In the typical example shown in FIG. 5, 35 of the available 57 channels have a total channel interference ratio TCIR value of 1% or lower with 22 of those 35 channels having a total channel interference ratio TCIR value of zero.

It should be appreciated that the more measurements which are carried out the more accurate the results.

In embodiments of the present invention, the mobile station may monitor channels other than the BCCH channel.

Figure 6:
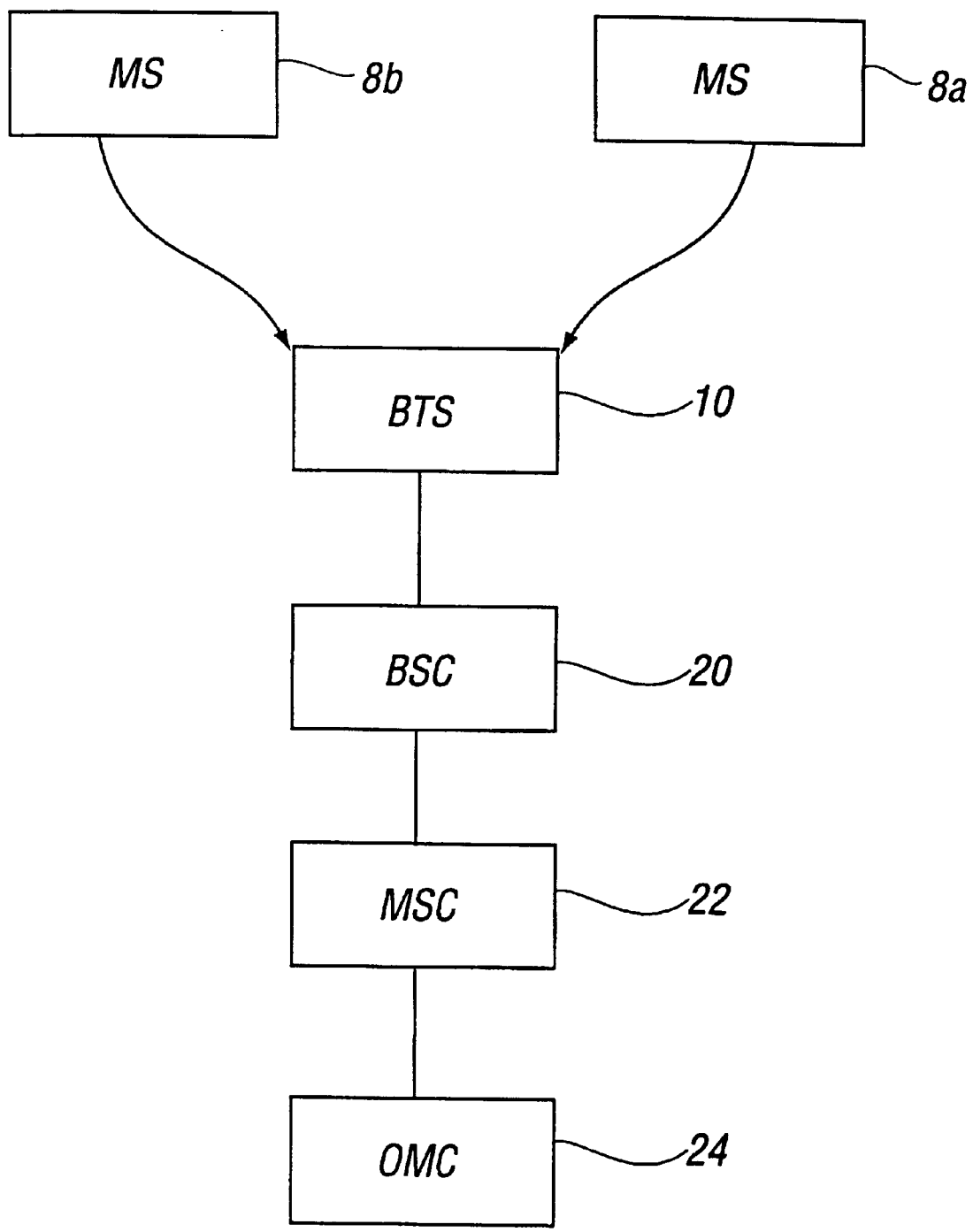
FIG. 6 illustrates the network elements for determining the channel allocation.

Reference will now be made to FIG. 6 which shows the network elements for determining the channel allocation. The mobile stations 8a and 8b measure the strength of the signals received from a number of base stations. This information is sent to the base station 10 associated with cell A. This information is forwarded to the base station controller 20 which calculates the cell coverage factors for each cell. The base station controller may do the normalisation. Information on the cell coverage factor is passed via the mobile switching centre 22 to the operation and maintenance centre 24 which has information as to the channels used by each cell. The operation and maintenance centre 24 then carries out the analysis described hereinbefore. The analysis can, however be carried out by any suitable network element.

Whilst embodiments of the present invention have been described in the context of a GSM system, embodiments of the present invention can be used with any other frequency division multiple access system. Embodiments of the invention can also be used to determine any resource which is to be allocated to more than one user in a system such of spreading codes in a spread spectrum system or the like.

Embodiments of the present invention are particularly applicable in environments in which the cell requiring the channels uses a relatively low level for the transmission power. Embodiments of the present invention can also be used with in building cells. A microcell layer can be built up which shares channels with a macrocell layer. This allows the level of traffic that can be carried per unit area to be increased.

The embodiment described hereinbefore has been concerned with allocating one or more frequencies for use in a microcell. However embodiments of the present invention can be used to allocate frequencies when a macrocell is added to a network.

Embodiments of the present invention can be used to dynamically vary the frequencies used in the various cells in order to reflect changes in the traffic in the network. In this latter case, the analysis embodying the present invention would be regularly carried out and not just for an hour a busy time.

In an alternative embodiment of the present invention, the analysis may take longer than an hour or may be repeated at intervals during the day. The analysis can also be performed at less busy times of the day in alternative embodiments of the present invention.

What is claimed is:

1. A method of allocating a channel in a cell of a cellular network comprising the cell and a plurality of other cells, the method comprising:
   receiving in the cell, a plurality of signals from at least one other cell;
   determining the average signal strength of the plurality of signals and the standard deviation for the signals;
   adding the average signal strength to the standard deviation;
   multiplying the sum of the standard deviation and the average signal strength by the number of the plurality of signals, to provide information; and
   using the information to determine one or more channels to be used in the cell.

2. The method according to claim 1, wherein the information is determined for each of a plurality of other cells.

3. The method according to claim 2, wherein the information determined for each other cell is normalized with respect to the information for that cell and the other cells for which information has been determined.

4. The method according to claim 1, wherein the cell has at least one station associated therewith, the at least one station being arranged to measure the strength of the signals received from the at least one other cell, the measurements being used to determine the average signal strength.

5. The method according to claim 4, wherein the at least one station is a mobile station.

6. The method according to claim 4, wherein a plurality of stations are provided in the cell, each of the plurality of stations being arranged to measure the strength of signals received from the at least one other cell, the measurements being used in determining the average signal strength.

7. The method according to claim 1, wherein reference signals from the at least one other cell are received and the average strength of the reference signals is determined.

8. The method according to claim 7, wherein a plurality of channels are used in at least one of the other cells and the strength with which the channels would be received in the cell is determined from the information based on the reference signals.

9. The method according to claim 8, wherein at least one channel is used in more than one of the other cells and the strength which the at least one channel would be received in the cell is determined by adding the contribution for the at least one channel from more than one of the other cells together.

10. The method according to claim 1, wherein in the using information step, one or more of the channels used by at least one or more of the plurality of other cells and which are not received in the cell or with the lowest strength are allocated to the cell.

11. The method according to claim 1, wherein the received signals are from a base station in the respective at least one other cell.

12. The method according to claim 1, wherein the cellular network is a GSM network.

13. The method according to claim 1, wherein received signals are from a base station in the respective at least one other cell and the signals are the BCCH channel of the respective base station.

14. The method according to claim 1, wherein the cell is a microcell.

15. The method according to claim 1, wherein the cell comprises an in building cell.

16. The network element for providing information for use in allocating a channel in a cell of a cellular network comprising the cell and a plurality of other cells, the network element comprising:
   means for receiving information on the strength of a plurality of signals from at least one other cell;
   means for determining the average signal strength of the plurality of signals and the standard deviation for the signals;
   means for adding the average signal strength to the standard deviation to provide information; and
   means for multiplying the sum of the standard deviation and the average signal strength by the number of the plurality of signals.

* * * * *